July 30, 1940.
D. A. QUARLES
2,209,662
METHOD OF SUPPORTING AERIAL CABLES
Filed Oct. 27, 1937
2 Sheets-Sheet 1
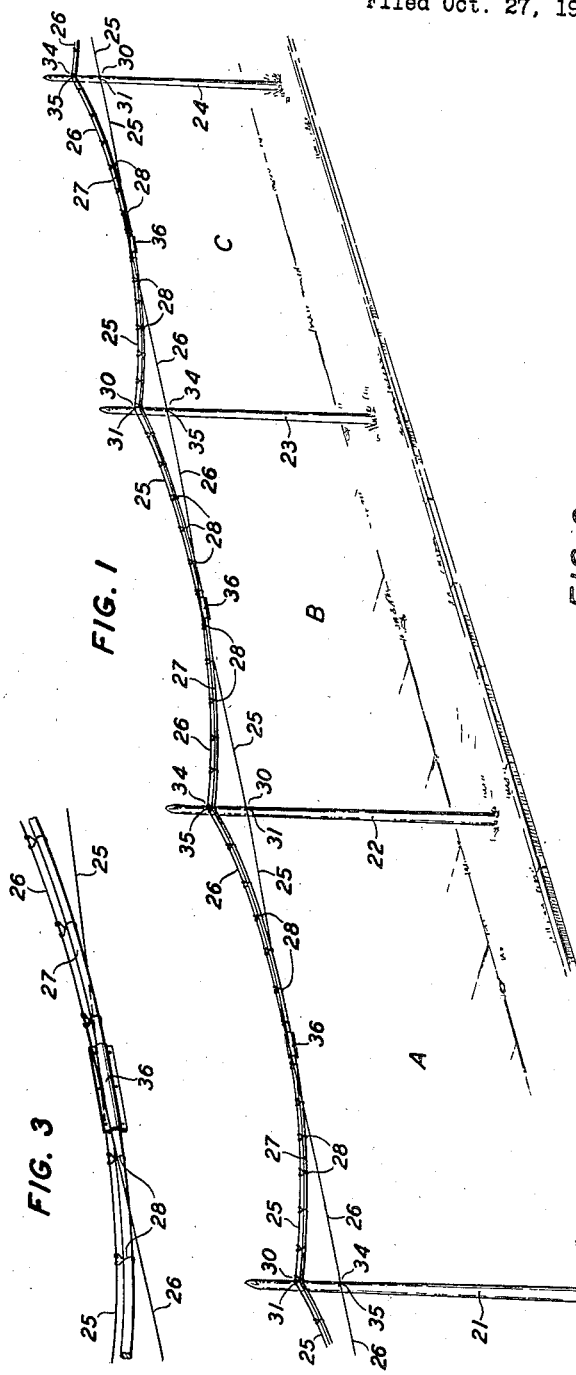
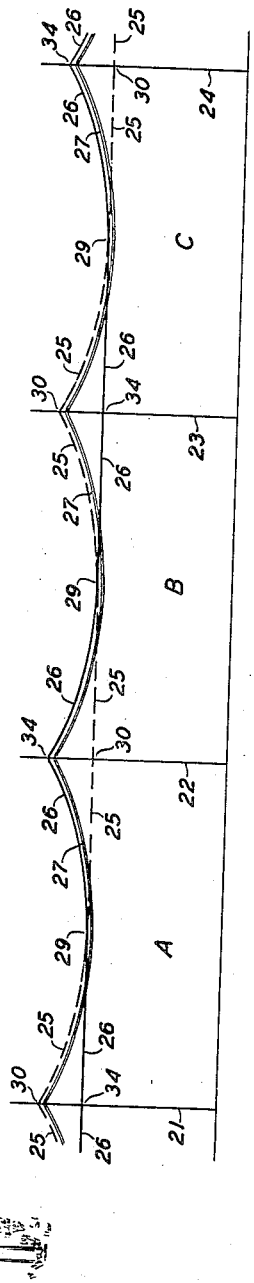
INVENTOR
D. A. QUARLES
BY J. MacDonald
ATTORNEY

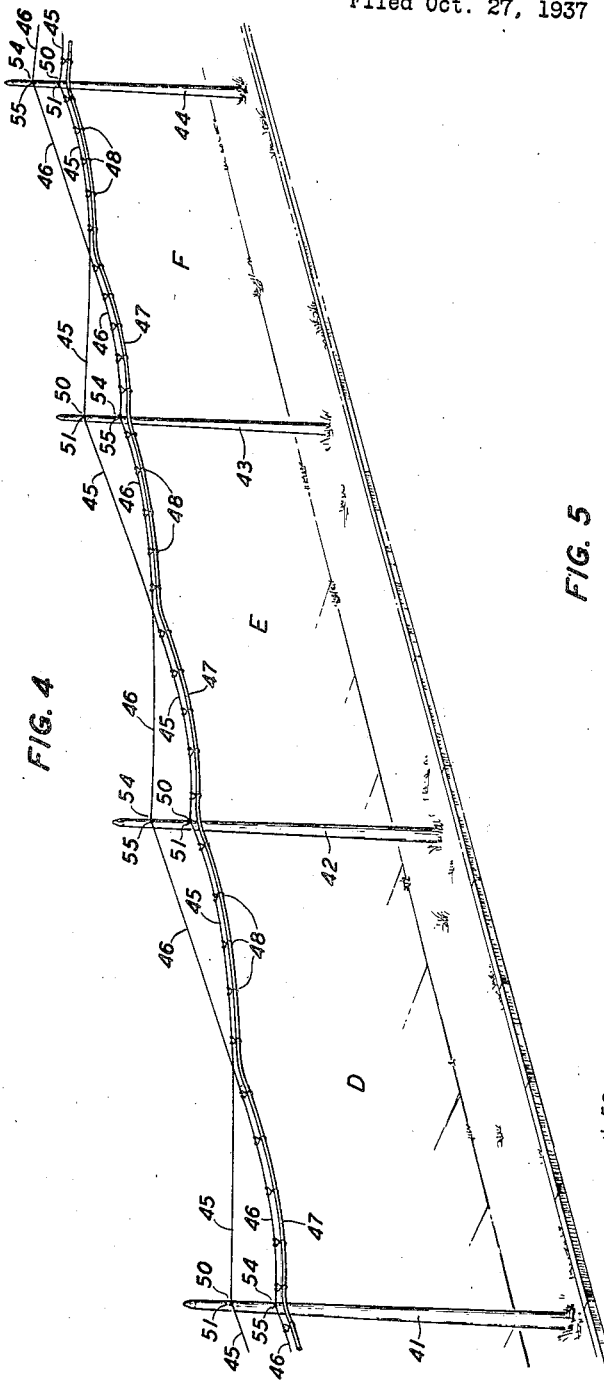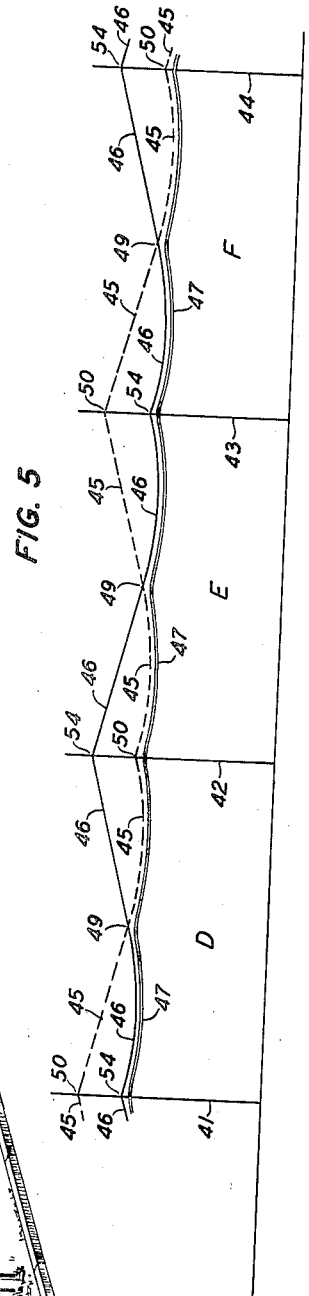

Patented July 30, 1940

2,209,662

UNITED STATES PATENT OFFICE 2,209,662

METHOD OF SUPPORTING AERIAL CABLES

Donald A. Quarles, Englewood, N. J., assignor to Bell Telephone Laboratories, Incorporated, New York, N. Y., a corporation of New York Application October 27, 1937, Serial No. 171,395

3 Claims. (Cl. 174—41)

This invention relates to a method of supporting aerial cable and more particularly to a supporting arrangement adapted to reduce deteriorating effects which are created by the excess expansion and contraction of the cable over that of its suspension strand when subjected to temperature changes, which causes bowing and ultimate cracking of the cable sheath.

The present method of supporting aerial cable consists in first securing a messenger strand to each pole of the line, attaching cable supporting rings to this strand at substantially equal distances in order to form a support for the cable and then drawing the cable through the rings where, initially, it lays substantially free from stress, in a position uniformly distant from the supporting strand.

At installation, the length of the strand and the length of the cable are approximately the same, but as the temperature changes, this relationship changes, due to the fact that the coefficient of expansion of the cable is about 64 per cent greater than that for the strand; also since the strand has an initial stretch not experienced by the cable the temperature elongation for the strand is less than if it were unstressed.

The effect of an increase in temperature above that at which the cable was installed is such as to make the cable elongate to a greater extent than the strand, thus causing bows to develop in the cable. In the larger sizes of cable these bows appear near the pole and as a result of swaying in the span the cable is rubbed against the supporting rings, causing abrasion of the sheath. The alternate bowing and straightening of the cable due to temperature changes causes stresses in the sheath which are concentrated at abraided points and eventually result in fatigue of the sheath and cracks. These cracks permit the entrance of moisture and result in service interruptions. If bowing can be prevented or materially reduced, a considerable reduction in the maintenance expense for aerial cable will result.

It is evident that there would be no bowing if the coefficient of expansion of the strand were such that it would, under tension, elongate with temperature increases to the same extent as the unstressed cable. While an approach to a solution of the problem from this standpoint is impracticable, applicant has devised a method of supporting aerial cable, which approximates the desired condition, and eliminates to a large extent the tendency for the cable to bow.

Aerial cables are also subject to the so-called "dancing" of cables or violent oscillations, that are produced at times by winds which set up harmonic vibrations in phase with the natural period of the cable spans. This dancing may after a period of time produce serious injuries to the cable sheath and sometimes to the supporting strand. Applicant's arrangement is such that when oscillations start they will be dampened out before the amplitude reaches serious proportions.

It is the primary object of this invention to prevent or at least reduce the detrimental effect upon aerial cable caused by the repeated bending and straightening of the cable through various temperature changes, and also dancing.

The present invention contemplates a method of suspension for aerial cable which provides that the temperature elongation of two spans of supporting strand is introduced into each span which supports cable. This results in a net change in the length of each supporting span of strand approximately double that experienced with the single strand method of suspension and more nearly equivalent to the change in length of the cable with its greater coefficient of expansion.

The invention will be more clearly understood from the following description when read in connection with the attached drawings of which:

Fig. 1 illustrates a portion of a pole line with three spans of cable suspended in accordance with the one form of applicant's invention;

Fig. 2 is a diagrammatic showing of the pole line and the supporting strands of Fig. 1;

Fig. 3 is a fragmentary mid-span view illustrating a cable shield for preventing damage to the cable sheath where the strands cross the cable;

Fig. 4 illustrates a portion of a pole line comprising three spans of cable suspended in a modified form of applicant's invention; and Fig. 5 is a diagrammatic showing of the pole and supporting strands in Fig. 4.

By referring to Figs. 1 and 2, it will be observed that two messenger or supporting strands are utilized for supporting the cable, that the two strands are supported at different levels on each successive pole and alternate in position, that the two strands cross in the middle of the span and that each span supports one-half span of cable, the transfer from one to the other being made at mid-span and the cable being supported in each case on the upper half of the strand. As shown in Fig. 1, there is illustrated three spans of aerial cable, A, B and C, supported by four poles 21, 22, 23 and 24. Each of the spans comprises a pair of messenger or supporting strands 25 and 26 which in turn support the cable 27 by means of the cable rings 28. As shown in Fig. 2, the messenger strands 25 and 26 are arranged one above the other at the poles 21, 22, 23 and 24 and cross but are not rigidly attached at a point 29 in the middle of the spans A, B and C so that the cable 27 in each span will be supported by a portion of each of the strands 25 and 26.

As shown in Fig. 1, the strand 25 is supported on the poles 21, 22, 23 and 24 at points 30 by means of suitable supports 31. In a similar manner the strand 26 is supported at the poles 21, 22, 23 and 24 at points 34 by means of suitable supports 35.

This method of installing the messenger strands 25 and 26 provides spans in which one-half of each span of cable is supported on one-half of a span of strand. Each strand therefore has an unloaded half-span associated and continuous with each half-span which supports cable. It is readily apparent that for any change in the length of a span of cable due to temperature variation there will be associated with it a change in length of the two spans of strand.

In order to prevent the strands 25 and 26 from injuring the cable where the strands cross, a shield 36 has been provided as shown in Fig. 3.

A modification of applicant's improved method of suspending aerial cable is shown in Fig. 4. In this method, like that previously shown in Fig. 1 there are three spans, D, E, F of aerial cable which are suspended from the poles 41, 42, 43 and 44. Each of these spans comprises a pair of messenger or supporting strands 45 and 46 which support the cable 47 by means of the cable rings 48.

In Fig. 5 which is a diagrammatic showing of Fig. 4 the messenger or supporting strands 45 and 46, like those in Fig. 1, are arranged one above the other at the poles 41, 42, 43 and 44 and cross at a point 49 in the middle of the spans D, E, F, with cable 47 on the lower portion of the strands 45 and 46.

As shown in Fig. 4, the strand 45 is supported on the poles 41, 42, 43, and 44 at points 50 by means of suitable supports 51. In a similar manner the strand 46 is supported at the poles 41, 42, 43 and 44 at points 54 by means of suitable supports 55. It will be observed that this method of installing the messenger strand is somewhat the same as that in Figs. 1 and 2. However, the difference in the two methods lies in the particular way the cable is installed and in this instance, the cable 47 is secured to the lower half of the strands 45 and 46 below the crossing point of the strands in the middle of the span; also in that the stands do not cross the cable at mid-span as in Figs. 1 and 2.

From the foregoing it is readily apparent that for any change in length of a span of cable due to temperature variation there will be associated with it a change in the length of two spans of strand. This results in maintaining a smaller differential in the length of a span of cable and its supporting strand, with temperature changes, than occurs with the single strand method of suspension.

Although this invention is shown in a specific form, it is to be understood that it is not limited to the details shown and that modifications may be made without departing from the spirit of the invention, and that it is only limited by the scope of the appended claims.

What is claimed is:

1. In a transmission line, a line of spaced poles, a pair of cable supporting strands spanning said poles and supported thereby, said strands crossing each other in each mid-span, cable supporting devices positioned on portions only of both strands in each span, and a sheathed cable, having a substantially greater coefficient of thermal expansion than the strand coefficient, positioned in said supporting devices.

2. In a transmission line, a line of spaced poles, a pair of cable supporting strands spanning said poles and supported thereby, said strands being supported one above the other alternately at successive poles and crossing in mid-span, cable supporting rings on portions only of both strands in each span and a sheathed cable, having a substantially greater coefficient of thermal expansion than the strand coefficient, hung from said cable supporting rings.

3. In a transmission line, a line of spaced poles, a pair of cable supporting strands spanning said poles and supported thereby, said strands being supported one above the other alternately at successive poles and crossing in mid-span, cable supporting rings positioned on the lower portions only of each strand in each span, and a sheathed cable, having a substantially greater coefficient of thermal expansion than the strand coefficient, hung from said cable supporting rings.

DONALD A. QUARLES.